United States Patent Office 3,354,933
Patented Nov. 28, 1967

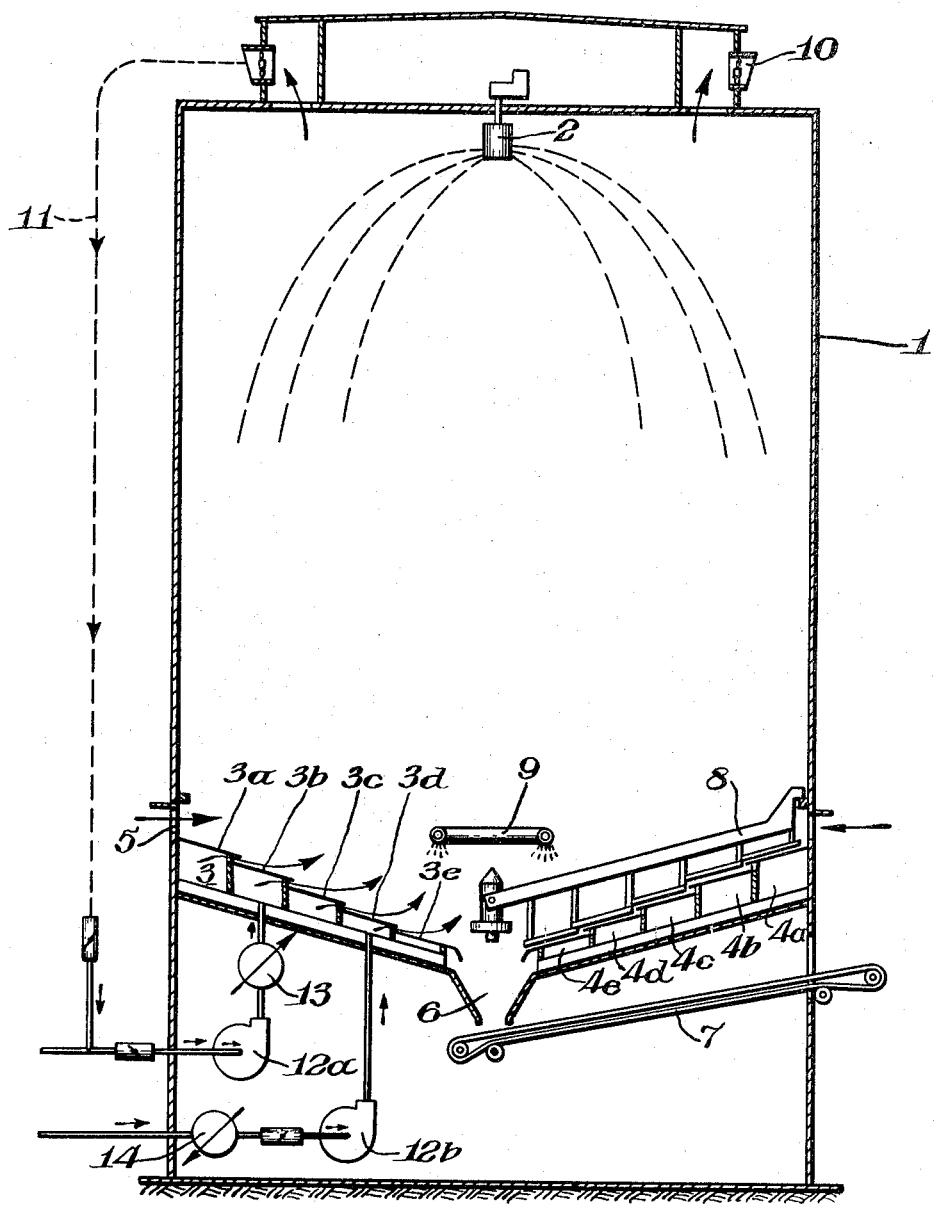

3,354,933
SPRAY DRYING PROCESS FOR PRODUCING
GRANULATES
Wilhelm Wengeler, Bochum-Stiepel, Germany, assignor to
Friedrich Uhde G.m.b.H.
Filed Apr. 20, 1965, Ser. No. 449,408
8 Claims. (Cl. 159—48)

This invention relates to a process for producing granulates from melts or highly concentrated solutions.

The conversion of granulates of more or less saturated solutions of stable materials or melts of such materials proceeds in a known manner, whereby the solutions or melts are apportioned in drops in the top of the spray tower by means of a centrifuge, a nozzle, or a similar device before they fall down in the tower wherein gases enter with a speed from below, which in turn decrease the falling speed of the drops. This can also affect the drops, so that they become hardened and drop to the bottom of the tower in the form of granules. The discharge of the granules from the bottom of the tower occurs through a central opening or through slots in the floor. A fluke is used therein as a transportation means to these discharge openings.

It is known to construct the floor of the spray tower in the shape of a funnel. The granulate then moves toward the discharge feed pipe, if necessary still supported by the effect of the fluke. In a known version, a funnel-shaped laminated screen is mounted at the bottom end of the granulating tower. Through the circular slots cooling gases are injected between the individual concentric plates of this screen, first streaming through the material collected on the laminated screen and then rising within the spray tower. Through the floor of a container, wherein powder-like or fine-grained materials are located, it is also known to allow gas to enter in such a way that the material is whirled up. Such an arrangement is designated as a whirl bed and is used for the purpose of drying the material, cooling, or mixing it together with various materials and if necessary to allow them to react together.

An object of this invention is to provide a process for producing a granulate mixture with the most even temperature possible at the spray tower discharge.

It was found that the granular materials accumulated at the bottom of a spray tower are obtained in the tower from solutions or melts by spraying by means of a centrifuge, a spinning nozzle, or a rotating plate, and are obtained in a particularly advantageous manner as a homogeneous combined product when the floor of the spray tower is constructed in the form of a laminated screen or a perforated sheet of metal, and gases of various temperatures and, if necessary, of variable pressure are injected through the concentric slots between the plates, or between the circular zones of the sheet in such a manner that warm drying gas enters through the outer slots or perforated rings and cooling gas enters through the inner ones. In this regard, it has been shown to be particularly suitable to supply the gases with such a speed that the granulate is shifted into a whirling condition where, by the direction of the entering gases or the conical shape of the floor, there results a conveyance to the central discharge opening, so that the average stay for the granulate is not essentially increased.

Since the rough granules, as a result of the centrifugal force in spraying with a rotating basket or plate or with a spinning nozzle, accumulate more toward the walls of the tower; and the finer granules accumulate more toward the middle of the tower, according to the inventive process it is possible to submit the granule according to its size to an individual type treatment, so that the desired effect, i.e. to obtain a granulate mixture with the most even temperature possible at the discharge of the spray tower, can be achieved in a simple manner.

A further advantage of the inventive process consists in the fact that because of the long period stay of the more slowly cooling rough granules and of the better heat transfer between granule and gas in the range of the gas entrance areas, it is possible to diminish the falling height of the drops and thus the length of the tower or to achieve a higher weight rate of flow while retaining the tower measurements.

Furthermore, the process according to the present invention offers the possibility, by means of a circular allocation device which is located above the floor, to treat the granulate already in the spray tower with powder-like materials or wetting agents which according to the previously known processes had to be added in a special process step. It has been shown as suitable in this connection to allow the gas to enter the gas entrance area situated under the allocation device at a lower speed than that which is conducted in the remaining areas.

Experiments have finally shown that it can be effective to use a stirrer, corresponding to the fluke in the known spray towers in the process according to the present invention, which promotes the homogeniety—avoidance of unmoving or stagnant areas—of the whirl bed. A further advantage is that an adherence on the bottom of products tending to bake on is avoided.

The gas distribution in the inventive process can proceed in such a manner that the total gas enters through the floor, or alternatively it is also possible to supply only a portion through the floor and the other portion through openings in the casing of the tower above the whirl bed.

Finally, it can be advantageous to circulate a portion of the heated gas leaving the tower at the top through one or more of the gas entrance areas and to return it again to the tower.

Next, one of the various possible embodiments of a device for the carrying out of the process is more fully described by referring to the diagram wherein similar reference characters refer to similar parts.

At the top of a spray tower 1 there is situated a centrifuge 2 which is used for spraying the melts or solution. The drops fall down the spray tower. The floor 3 of the spray tower 1 consists of concentric rings $3a$, $3b$, $3c$, $3d$, $3e$, leaning toward the center and staggered. Under each of these rings there is a circular chamber $4a$, $4b$, $4c$, $4d$, $4e$ into which gas is injected by blowers $12a$ and $12b$ in a regulated amount through an isolated supply main, which gas is heated before to a temperature of 80–300° C. 13 and cooled to 5–40° C. 14 respectively. The chambers have at their upper end discharge openings for the gas in the area of the gradation of the bottom rings. Above the floor there are arranged additional inlets 5.

The dried material leaves through the funnel 6 in the middle of the floor and is conducted on the conveyer belt 7 to the supply base. A rotatable stirrer 8 is mounted above the floor 3. A circular allocation device or supplemental material introducing means 9 serves for the treating of the material with the additives, such as powder materials or surface active materials. At the top of the tower 1 gas is drawn off by ventilators 10. A portion of the drawn off gas is returned to one of the ring chambers by means of conduit 11.

Obviously many modifications and variations of the present invention are possible in light of the above teachings. It is, therefore, to be understood that within the scope of the appended claims the invention may be practiced otherwise than as specifically described.

I claim:

1. A process for the granulation of chemical materials by spraying the materials in droplet form in a spray tower and introducing a gas through the floor of the tower countercurrent to the falling drops, characterized in that the gas is introduced through different separated concentric slots in the floor of the tower at variable temperatures so that hot gas enters the tower through the outer concentric slots and cool gas enters the tower through the inner concentric slots.

2. A process according to claim 1, characterized in that the gas is introduced with variable pressure into the individual concentric slots.

3. A process according to claim 1 characterized in that the gas enters with such a speed that the material situated above the floor is put in a whirling condition.

4. A process according to claim 1, characterized in that the gas enters the tower in a radially inward direction declined from the horizontal and is directed toward a dried material outlet opening in the center of the floor.

5. A process according to claim 1 characterized in that a portion of the gas enters through the floor and the other portion enters above the floor through openings in the casing of the tower.

6. A process according to claim 1 characterized in that the material above the floor is also moved by a stirring device.

7. A process according to claim 1 characterized in that before leaving the spray tower the substantially dried solidified material above the floor is treated by a supplemental material introducing means positioned directly above a dried material outlet opening in the center of the floor for modifying the basic material in process.

8. A process according to claim 7 characterized in that the gas enters through the inner concentric slots in the floor of the tower at a lower speed than through the remaining slots.

References Cited

UNITED STATES PATENTS

| | | | |
|---|---|---|---|
| 1,837,869 | 12/1931 | Jewett et al. | 260—704 X |
| 1,985,987 | 1/1935 | Hall | 159—48 |
| 2,525,025 | 10/1950 | Feil | 202—205 |
| 2,670,036 | 2/1954 | Spalding | 159—48 |
| 2,729,428 | 1/1956 | Milmore | 165—2 |
| 2,842,193 | 7/1958 | Ballestra | 159—4 |
| 2,872,973 | 2/1959 | Nieuwenhuis et al. | 159—4 |
| 2,992,141 | 7/1961 | Peebles | 127—61 |

FOREIGN PATENTS

| | | |
|---|---|---|
| 886,533 | 1/1962 | Great Britain. |
| 251,377 | 8/1948 | Switzerland. |

NORMAN YUDKOFF, *Primary Examiner.*

J. SOFER, *Assistant Examiner.*